July 31, 1951  C. R. GREGORY  2,562,312
ADJUSTABLE CAMERA BACK
Filed March 31, 1950  5 Sheets-Sheet 1
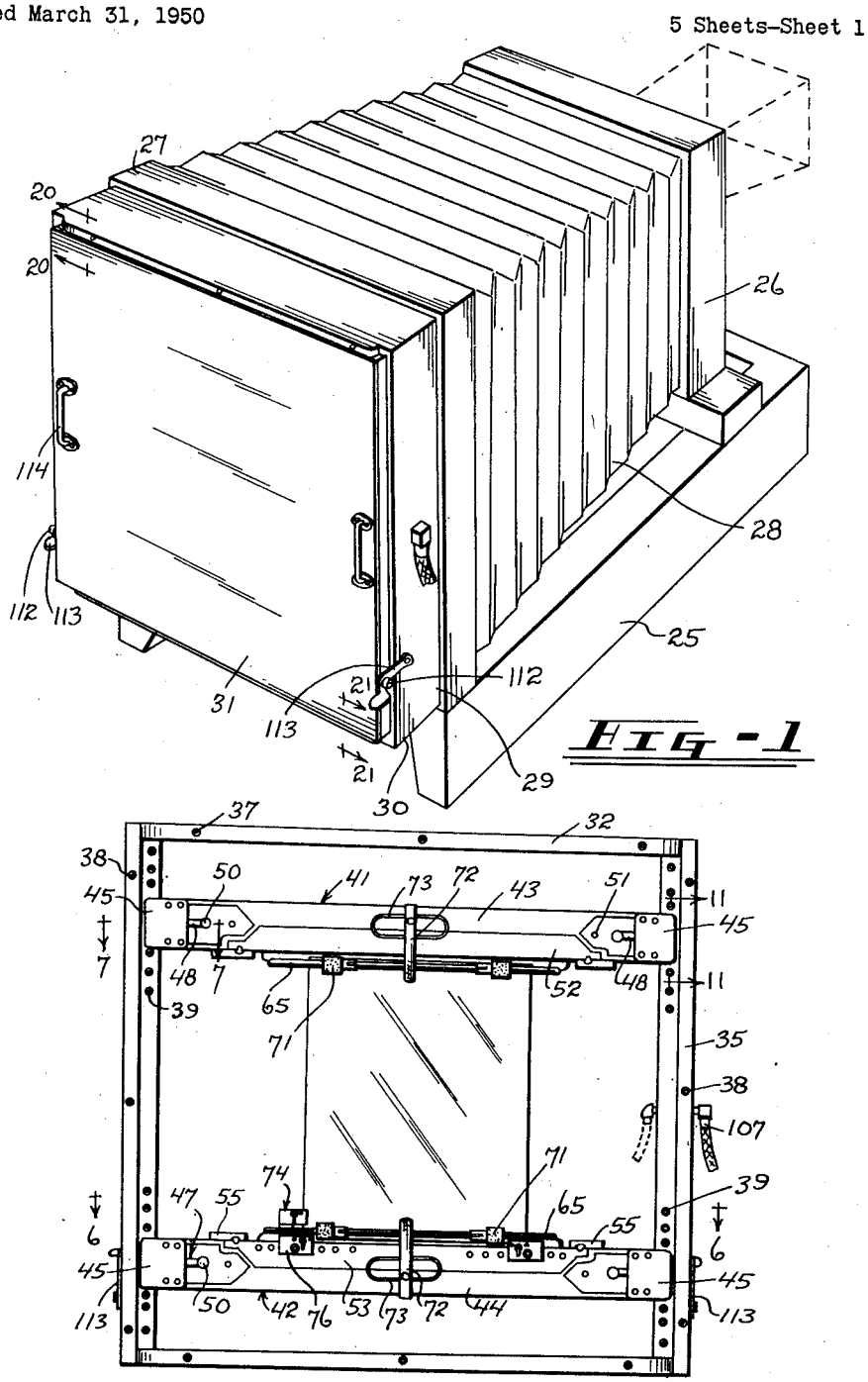
INVENTOR
Cresswell Redvers Gregory
by Edward N. Fetherstonhaugh
ATTORNEY INVENTOR
Cresswell Redvers Gregory
by Edward N. Fetherstonhaugh
ATTORNEY

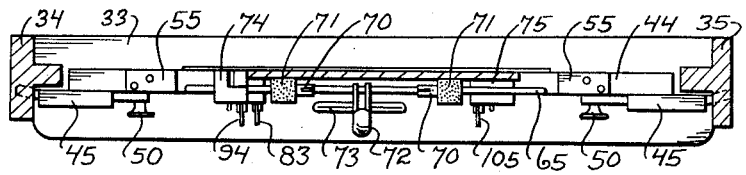
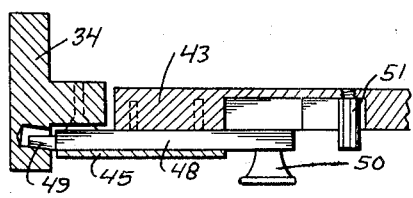
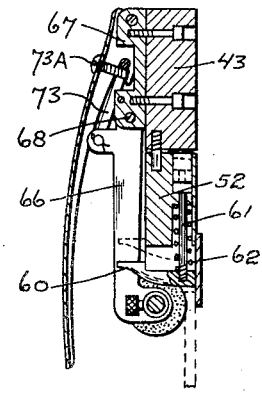
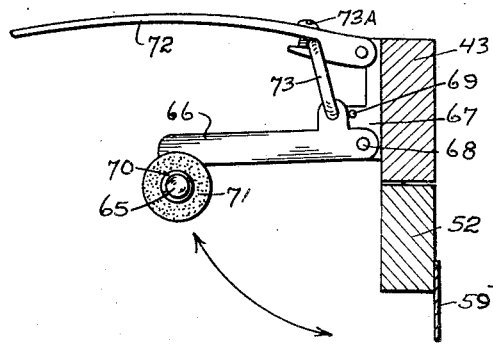
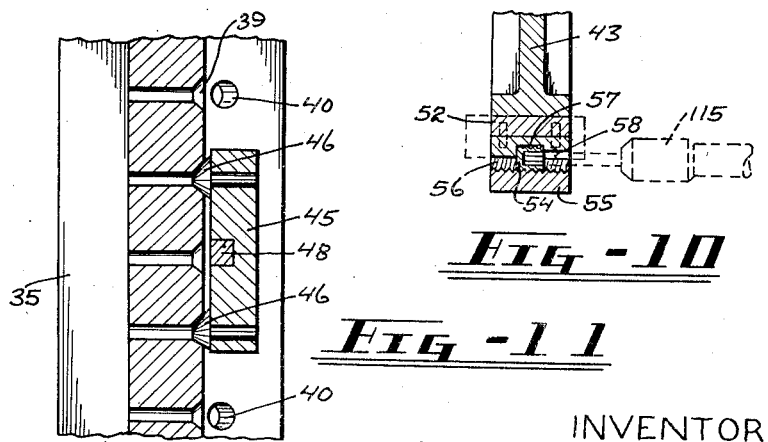

July 31, 1951 C. R. GREGORY 2,562,312
ADJUSTABLE CAMERA BACK
Filed March 31, 1950 5 Sheets-Sheet 4
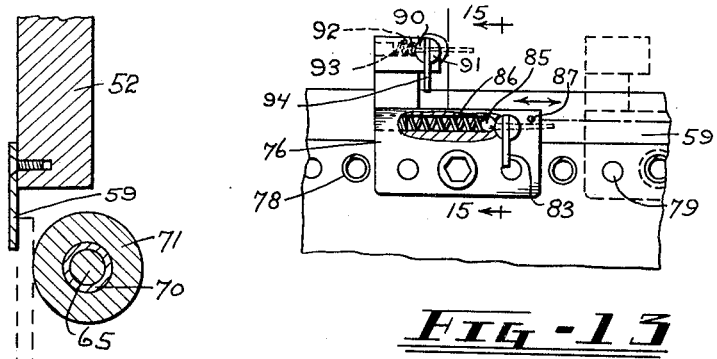
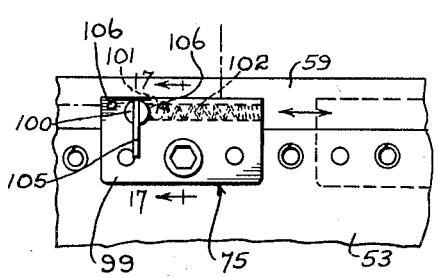
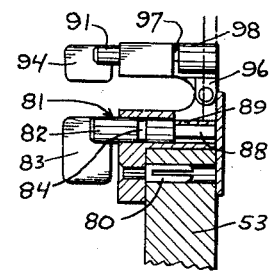
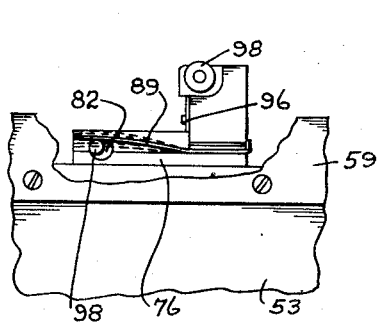
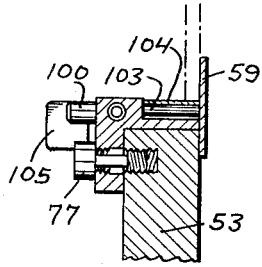
INVENTOR
Cresswell Redvers Gregory
by Edward N. Fetherstonhaugh
ATTORNEY July 31, 1951 C. R. GREGORY 2,562,312
ADJUSTABLE CAMERA BACK
Filed March 31, 1950 5 Sheets-Sheet 5
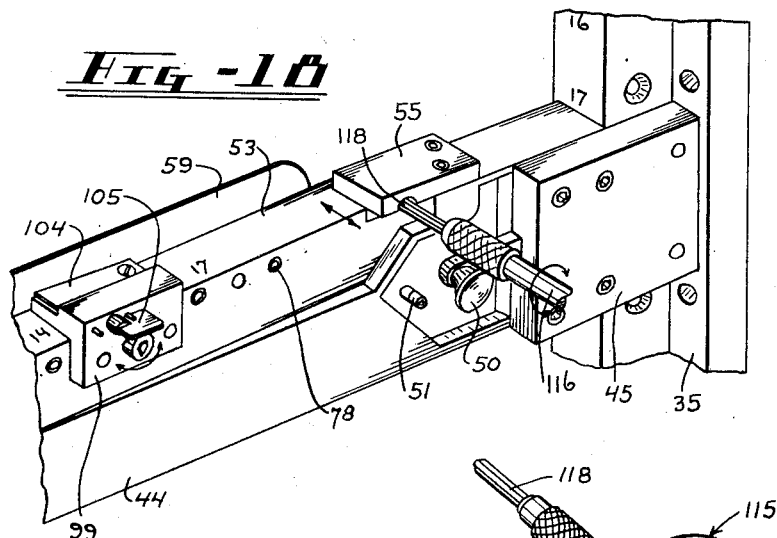
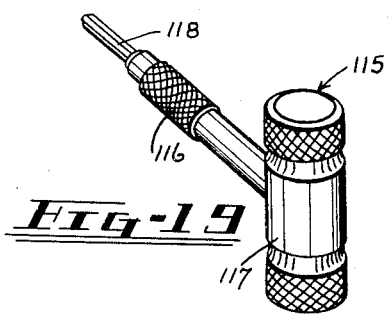
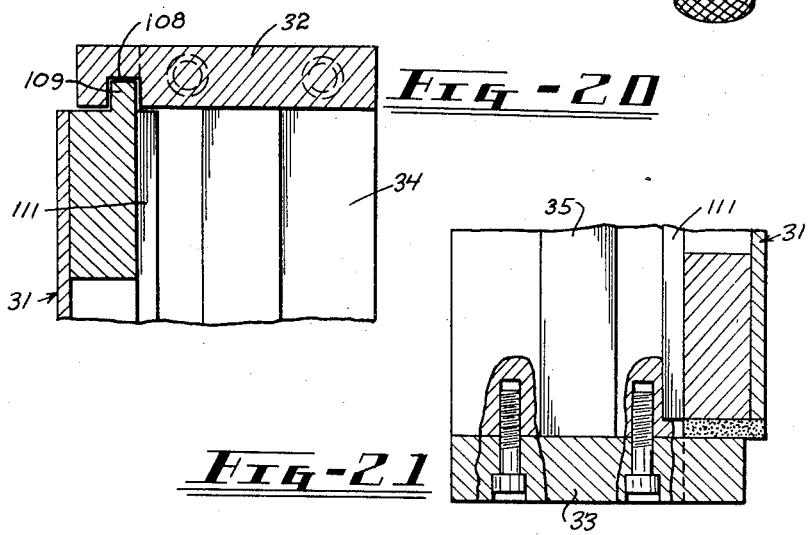
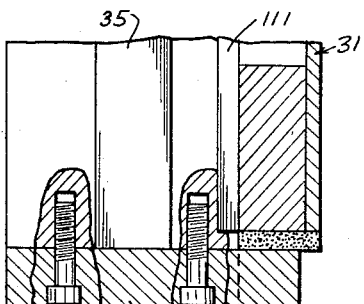
INVENTOR
Cresswell Redvers Gregory
by Edward N. Featherstonhaugh
ATTORNEY Patented July 31, 1951

2,562,312

UNITED STATES PATENT OFFICE 2,562,312

ADJUSTABLE CAMERA BACK

Cresswell Redvers Gregory, Montreal, Quebec, Canada, assignor to Bomac Correctone Process Limited, Toronto, Ontario, Canada Application March 31, 1950, Serial No. 153,044

7 Claims. (Cl. 95—69)

1

The invention relates to improvements in an adjustable camera back as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to provide an adjustable camera back which will substantially hold a photographic plate absolutely firm in any adjusted position and in which vibration will be minimized during the mounting and positioning of this plate; to furnish a camera back which will be easily adjustable and in which the various adjustments will be easily assembled and simple to operate; to contrive an adjustable camera back which will facilitate the positioning of a photographic plate therein under any conditions, such as in a dark room or the like; to devise an adjustable camera frame which may be used with a back or without a back depending on whether the frame is being used at the rear or the front of a camera and in which the frame will be independently capable of positioning one or more photographic plates precisely in position therein; to make an adjustable camera back in which a number of plates may be secured in any position therein adjacent to one another and in which these plates may be of any suitable commercial size; to assemble an adjustable camera back in a camera in which the various parts will be simple in construction and inexpensive to manufacture; and generally to provide an adjustable camera back which will firmly hold one or more plates in any suitable position therein and which will be efficient for its purpose.

In the drawings:

Figure 1 is a perspective view showing the adjustable camera back and the cover therefore mounted on the rear of the camera.

Figure 2 is a front view of the adjustable camera back with its cover removed and showing a plate being held in position therein.

Figure 6 is an enlarged sectional plan view of the lower adjustable support bar as taken on the line 6—6 in Figure 2.

Figure 7 is an enlarged sectional plan detail through one end of the upper adjustable support bar as taken on the line 7—7 in Figure 2 and showing the lock bolt in the end thereof in an engaged position with respect to the frame of the adjustable camera back.

Figure 8 is an enlarged sectional vertical detail as taken on the line 8—8 in Figure 4 and showing the plate clamp on the upper adjustable support bar in a closed position and holding a photographic plate firmly against a plate rest on the device.

Figure 9 is an enlarged sectional detail similar to Figure 8, but showing the plate clamp in an open position.

Figure 10 is an enlarged sectional vertical detail as taken on the line 10—10 in Figure 4 and showing the adjustable screw for varying the position of an adjustable insert located on the inside edge of the adjustable support bar.

Figure 11 is an enlarged sectional vertical detail as taken on the line 11—11 in Figure 2 and showing the cones and cone settings that are used to hold the adjustable support bars in rigid alignment.

Figure 12 is an enlarged fragmentary sectional view as taken on the line 12—12 in Figure 4 and showing the construction of the cushion rollers mounted on the plate clamp bars.

Figure 13 is an enlarged fragmentary front view showing the left hand plate holder which allows for horizontal and vertical adjustment of the photographic plate.

Figure 14 is an enlarged fragmentary front view showing the right hand plate holder which allows for horizontal adjustment of the photographic plate.

Figure 15 is a sectional detail as taken on the line 15—15 in Figure 13 and showing the spring and roller on which the edge of the plate rests.

Figure 16 is an enlarged fragmentary rear view showing the left hand plate holder and the manner in which the spring is secured thereto.

Figure 17 is a sectional detail as taken on the line 17—17 in Figure 14 and showing the manner in which the plate holders are secured to an adjustable insert.

Figure 18 is an enlarged fragmentary perspective view showing a portion of the lower support bar in which the adjustable insert therein is moved to an extreme inner position by means of a tool.

Figure 19 is a perspective view of the tool used for effecting all the adjustments necessary with respect to the adjustable support bars, the adjustable inserts, and the plate supports.

Figure 20 is an enlarged fragmentary sectional detail as taken on the line 20—20 in Figure 1 and showing the construction of the upper portion of the frame of the adjustable camera back and the cover therefor.

Figure 21 is an enlarged fragmentary sectional detail as taken on the line 21—21 in Figure 1 and showing the construction of the lower portion of the adjustable camera back and cover therefor.

Like numerals of reference indicate corresponding parts in the various figures.

Figure 3:
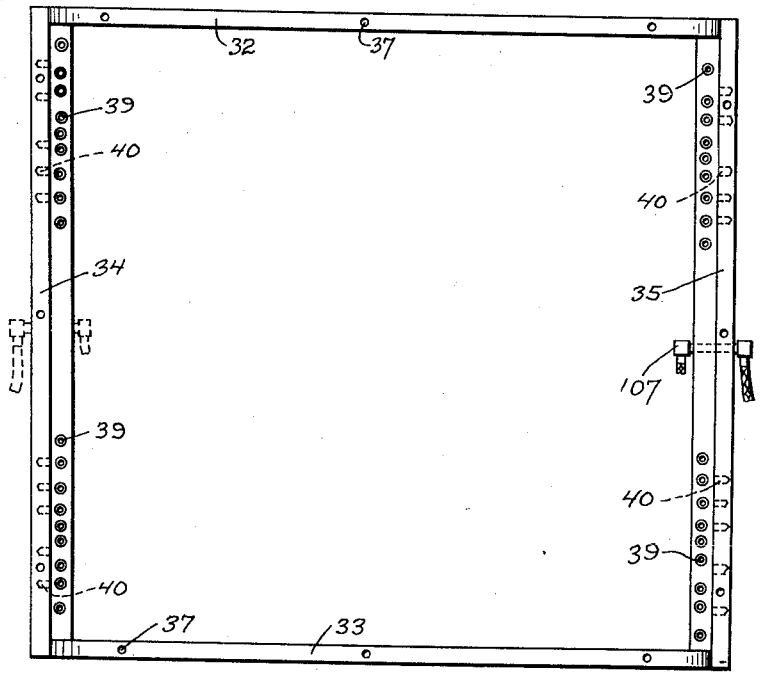
Figure 3 is an enlarged front view showing the frame of the adjustable camera back with the upper and lower support bars removed therefrom.
Figure 4:
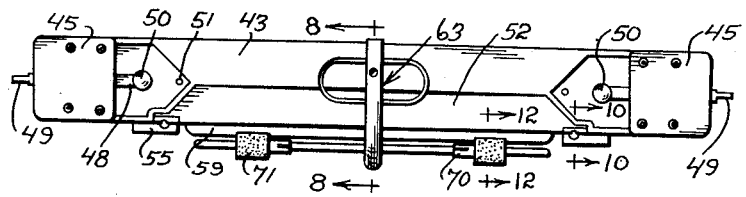
Figure 4 is an enlarged front view of the upper adjustable support bar and showing the plate clamp in a closed position.
Figure 5:
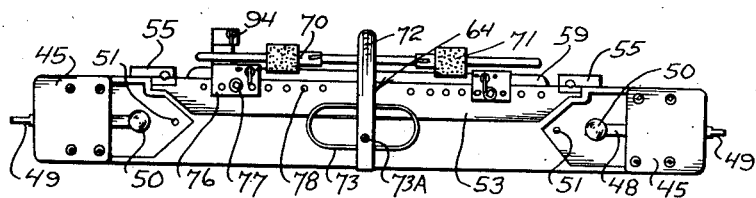
Figure 5 is an enlarged front view of the lower adjustable support bar and showing the plate clamp in a closed position.

Referring to the drawings, the camera as illustrated in Figure 1 consists of a base 25 having a lens frame 26 and a rear support structure 27 suitably supported thereon, and this lens frame and rear support structure are connected to one another by bellows 28. The adjustable camera back 29 consists of a frame 30 which is suitably mounted on the back of the rear support structure 27 and has a cover 31 movably secured to the rear portion thereof.

The frame 30 of the adjustable camera back 29 consists of horizontal cross members 32 and 33 and vertical side members 34 and 35 which are fixedly secured to these horizontal cross members thus forming a rectangular frame or structure. The cross section of the vertical side members 34 and 35 is of a T-shaped formation and the horizontal cross members 32 and 33 are of a rectangular formation. The horizontal cross members 32 and 33 have holes 37 extending horizontally therethrough and the front face of these cross members are countersunk. The flanged portion of the T-shaped vertical side members 34 and 35 have holes 38 extending horizontally therethrough, or at right angles thereto and these holes are countersunk on the front edge of this flanged portion. The holes 37 and 38 in the cross members and vertical side members, respectively, provide a means of fixedly securing the frame 30 to the rear support structure 27 of the camera.

A plurality of holes 39 extend through the web of the T-shaped vertical side members 34 and 35 and these holes are counter sunk on the front surface of the web. A plurality of horizontal holes 40 extend partly through the front flanged portion of the T-shaped vertical side members 34 and 35. These holes 40 are drilled a suitable distance into the inner face of the outer flange portion at a slight angle so that the blind end end. The holes 39 and 40 in the web and flanged portions, respectively, of the vertical members 34 and 35 are suitably spaced apart to coincide with is closer to the rear of the frame than the open positioning and locking means on the upper and lower adjustable support bars 41 and 42. These adjustable support bars 41 and 42 consist of an upper and lower cross bar 43 and 44 respectively. Each of the cross bars 43 and 44 which form the body of the upper and lower adjustable support bars 41 and 42 are of a somewhat I-shape, in that they each have a central portion with top and bottom flanges projecting outward from both surfaces thereof, and the bottom portion of the upper cross bar 43 is cut away and the upper portion of the bottom cross bar 44 is also cut away to permit the mounting of adjustable inserts 52 and 53. The central portion of each of the cross bars 43 and 44 adjacent the cutout portion is of a rectangular solid formation. Each of the cross bars 43 and 44 have lock plates 45 fixedly secured to the front face towards the ends thereof, and these lock plates extend outward past the ends of the cross bars. The extending portion of each of the lock plates have a pair of cones or tapered pins 46 extending outward from the inner surface thereof. Each of the lock plates 45 also have a lock bolt 47 slidably fitted therein and adapted to extend outward longitudinally past the ends of these plates. Each of the lock bolts 47 consists of a body portion 48 and a tapered end portion 49 extending outward therefrom. A knob 50 is fixedly secured on the inner end of the body portion of each of the lock bolts 47 providing a means of manually operating the same. A stop pin 51 is located towards each end of the cross bars 43 and 44 and in alignment with the lock bolts 47 so that they may engage the latter when the same are moved to an unlocked position. The cones 46 extend outward from the lock plates 45 and are adapted to engage in the cone-like or countersunk holes 39 in the web portion of each of the T-shaped vertical members 34 and 35 for the purpose of positioning the upper and lower support bars 41 and 42, and at the same time the tapered end portion 49 on each of the lock bolts 47 are engaged in the holes 40 in the flanged front portion of these T-shaped vertical members. As these holes 40 are drilled at an angle that coincides with the tapered end portion 49 of the lock bolts, these bolts tend to tighten the cones 46 against their respective seats in the cone-like or counter sunk holes 39 thus holding the support bars in a rigid position. In this manner each of the adjusting support bars 41 and 42 may be definitely located and locked in any suitable position with respect to the frame 30 and the latter has numerals depicted on the inner surface of the web portions of the T-shaped vertical members thus enabling the operator to know exactly the position in which he should place the support bars for a particular size of photographic plate before engaging and locking same in position.

The adjustable inserts 52 and 53 which are located in cutouts in the upper and lower cross bars 43 and 44 are held in position by threaded studs 54 which engage with threaded caps 55. In this respect the threaded caps 55 are fixedly secured to the upper and lower cross bars toward each end thereof and each have a semi-circular tapped hole 56 extending therethrough. Each of the threaded studs 54 are accommodated in a recess 57 in the ends of the adjustable inserts and are free to turn within this recess and the semi-circular tapped hole 56 in the threaded cap fits over the recess 57 and the studs 54 therein. A semi-circular cutout 58 is located in the adjustable inserts directly opposite the semi-circular tapped hole 56 in the threaded caps 55 thereby permitting a tool to be inserted therein for turning the threaded studs 54. As these threaded studs 54 are turned in either direction they engage with the semi-circular tapped holes 56 in the threaded cap 55 and accordingly move the end of the adjustable insert either inward or outward with respect to the upper or lower cross bar 43 or 44. The adjustable inserts 52 and 53 are secured in the center thereof by means of a pin extending into the upper or lower cross bar and a washer is located between the adjustable insert and the cross bar thereby raising the upper edge of this insert slightly above the edge of the cross bar thus permitting the threaded caps and threaded studs to substantially bear on and effectively hold the ends of the inserts in any adjustable position.

A flat holding strip 59 is fixedly secured to the far side of the adjustable inserts 52 and 53 and extends past the inner edges thereof thus providing a backing against which a photographic plate may be held. A spring catch 60 is mounted in a recess in a lower edge of the upper cross bar 43 and is held in position by means of a stud 61 and a compression spring 62. This spring catch is adapted to bear down on the upper edge of a photographic plate when the same has been placed adjacent the flat holding strip 59 and tends to gently hold the upper end of this plate in position.

A plate clamp 63 and 64 is mounted on the upper and lower cross bars 43 and 44, respectively, and it is adapted to bear against the rear face of a photographic plate along the upper and lower portions thereof. Each of these plate clamps 63 and 64 consists of a rod 65 which extends parallel to the cross bar and is movably supported on the arms 66. In this respect, the rod 65 is fixedly secured with respect to the arms 66 and the opposite ends of the latter are pivotally mounted on a bracket 67 secured to the cross bar, and a pin 68 which extends through part of the same. A stop 69 also extends through this bracket 67 so as to determine the distance that the arms 66 may swing upward. A pair of sleeves 70 are slidably mounted on the rod 65 and resilient rollers or rubber cushions 71 are fixedly secured on these sleeves. A lever 72 is pivotally mounted on the opposite end of the bracket 67 to that of the arms 66 and a spring 73 is connected to the lever 72 and the arms 66.

It will be seen in Figure 9 that when the lever 72 is raised or lowered the arms 66 are also raised or lowered. As the lever 72 is lowered or closed to a certain position the pivot point of the lever, the pivot point of the spring in the lever, and the point of connection of the spring to the arms will be in line and as the lever is closed or lowered further the pivot point of the spring in the lever passes this neutral line and tends to keep the lever in a closed position. If the lever is held in a closed position by the spring pressure, a pressure will also be exerted on the arms. Due to the fact that the pressure applied by the spring 73 must not be too great and also that it is used as a positive link during a portion of its operation the spring is made of a single piece of wire formed to a double U-shaped or an elongated oval formation. This shape of spring allows for a positive connection between the lever and arm, and at the same time allows for spring action when the sides are compressed towards each other. The spring 73 is held in the arms 66 by means of cotter pins and in the lever 72 it is mounted in slots and held in position in these slots by means of a screw 73A.

A left hand plate holder 74 and a right hand plate holder 75 are movably mounted on the upper and lower adjustable inserts 52 and 53, and serve as holding and levelling devices for adjusting the position of a photographic plate in the camera.

The left hand plate holder consists of a base 76 which is movably secured to the adjustable insert 53 and secured in position by means of a screw 77 which is adapted to be threaded into any one of a number of tapped holes 78 which are suitably spaced apart along the left hand portion of this adjustable insert. Positioning holes 79 are located on each side of the tapped holes 78 and are adapted to be engaged by a pair of pins 80 which are fixedly secured in the base 76 and in conjunction with the screw 77 substantially holds the left hand plate holder 74 in position with respect to the adjustable insert 53.

A vertical adjusting means 81 is mounted on the base 76 and consists of a shaft 82 which extends through a portion of the base 76 and a finger grip 83 is fixedly secured on the outer end of this shaft. An annular groove 84 is cut in the shaft 82 and a retaining ball 85 is held in engagement therewith by means of a compression spring 86, thus permitting the shaft 82 to turn and at the same time preventing it from being removed from the base. A pair of stop pins 87 are fixedly secured in the base and project outward therefrom at each side of the shaft 82 and these pins engage the finger grip 83 when the same is turned a predetermined distance in either direction. An eccentric pin 88 is fixedly secured in the inner end of the shaft 82, and a satin spring 89 lies over this eccentric pin 88 and is raised or lowered by the latter as the shaft 82 is turned, thus providing a means of vertically adjusting a photographic plate resting thereon.

The horizontal adjusting means 90 consists of a shaft 91 which extends through a raised portion of the base 76 and is held in position by a retaining ball 92 engaging an annular groove therein, and a compression spring 93 bearing against this ball. A finger grip 94 is fixedly secured on the other end of the shaft 91, and the distance that the latter may turn is determined by a stop pin 95 and a stop strip 96. An eccentric pin 97 is secured in the inner end of the shaft 91 and a roller 98 is rotatably mounted on this eccentric pin. This roller is adapted to engage the edge of a photographic plate and its position may be adjusted by turning the shaft 91 thereby providing a means of precisely adjusting the position of the photographic plate horizontally.

The right hand plate holder 75 is movably secured on the adjustable insert 53 and is adapted to provide a means of vertically adjusting the position of the right hand side of a photographic plate resting thereon. This right hand plate holder is provided with a screw and pins which engage in holes suitably spaced apart in the adjustable insert in a similar manner to that described in the foregoing relating to the left hand plate holder 74. In this instance the right hand plate holder consists of a base 99 having a shaft 100 extending through the upper portion thereof which is held in position therein by a retaining ball 101 and a compression spring 102 in a similar manner to the left hand plate holder 74. An eccentric pin 103 is secured in the end of the shaft 100 and a satin spring 104 lies over this eccentric pin and is raised or lowered by the latter upon the turning of the shaft 100. A finger grip 105 is secured on the outer end of the shaft 100 and stop pins 106 are secured in the base and engage the finger grip 105 when it is turned a suitable distance in either direction. The left hand and right hand plate holders 74 and 75 are adapted to be moved laterally to any suitable position depending upon the width of the photographic plate when used and numerals are depicted on the top edge of the adjustable insert so as to enable the operator to easily and quickly determine the positions that these plate holders should be moved to depending on the size of the photographic plate being used.

A fitting assembly 107 is provided in the vertical member of the frame 30 and adapted for connection to a vacuum arrangement as used for holding photographic plates substantially in contact with one another. This fitting assembly may be mounted in either side of the frame 30 and its position would be determined by the layout of the equipment being used in each installation.

The horizontal cross member 32 of the frame 30 has a longitudinal groove 108 in the underside towards the front of the cross member and this groove extends almost the entire length of the cross member. The cover 31 has a projection or tongue 109 extending along the top edge thereof and which engages in the longitudinal groove 108 in the horizontal cross member 32 of the frame when the cover is being placed in position thereon. A resilient strip 110, which may be of a rubber or any suitable material, is adhered to the bottom edge of the cover 31 and projections or tongues 111 extend vertically along the inside face of the cover towards each side thereof. These projections or tongues 111 fit inside the vertical side members 34 and 35 of the frame 30 to locate the cover longitudinally when the same is placed in position on the frame. A pair of fastening pins 112 extend outward from the side edges of the cover 31 towards the bottom thereof and these are adapted to be engaged by hooks 113 which are pivotally secured to the outer side of the vertical side members 34 and 35 which form part of the frame. This cover 31 is also provided with a pair of handles 114 which facilitate removal and replacing of the cover 31 with respect to the frame 30.

In the use of the invention the cover 31 is removed from the frame 30 so that a photographic plate may be suitably secured in this frame prior to the taking of a picture. When it is determined what size of photographic plates is to be used, the operator places the upper and lower adjustable support bars in the proper position on the vertical members 34 and 35 of the frame 30. The locations of these adjustable support bars is facilitated by the numerals depicted on the inner edge of the vertical members 34 and 35 as these indicate the size of standard commercial photographic plates. The left hand and right hand plate holders 74 and 75 are then positioned longitudinally on the lower insert 53 in a position indicated by numerals depicted on the top edge thereof and which indicates the other dimension of the photographic plate. The left hand and right hand plate holders 74 and 75 are set in a central adjustable position so that later they may be adjusted one way or the other to bring the plate into register when replaced in the frame. The plate is then placed on the satin springs 89 and 104 of the plate holders and the left hand edge of the plate is placed in abutment with the roller 98 on the left hand plate holder 74 and the front face of the plate at top and bottom rest against the flat holding strips 59 and the spring catch 60 engages the top edge of this plate towards the center thereof. The plate is now held in position in the frame 30 and this eliminates any possible chance of the same moving. The plate clamps are then brought down to bear against the rear surface at the top and bottom thereof. In this instance the resilient rollers or cushions 71 are movably adjusted on the rod 65 of the plate clamps so that they bear against the plate as close to the outer edges as possible and the levers 72 are closed and held in position by the spring 73 as previously described. The cover 31 is then placed in position on the frame 30 and the camera is ready for use. To remove the plate the plate clamps are opened and the plate is merely removed from its support. Upon replacing of the plate in the camera it will be seen that if necessary slight adjustment of the plate holders 74 and 75 will provide absolute register. If for any reason further adjustment of the plate is needed to provide for perfect focus the adjustable inserts 52 and 53 may be precisely moved inward or outward with respect to the adjustable support bars as previously set forth, and accordingly slightly altering the distance between the plate and the lens of the camera.

A tool 115 is provided with the adjustable camera back and consists of a handle 116 in the form of a double hammer head, and a shank 117 fixedly secured in the central portion of this handle and extending outward therefrom at right angles thereto, and a hexagon end tool 118 fixedly secured in the outer end of the shank 117 and of a size to coincide with all the hexagon holes in the various adjusting nuts, studs, and the like which are used in the construction of the adjustable camera back.

In using the invention as hereinbefore described at the front of the camera instead of the rear the cover 31 is removed from the frame and the various adjustments on the latter, and clamping means may be employed in the same manner as set forth in the foregoing for positioning one or more photographic plates and rigidly securing the same therein.

What I claim is:

1. In an adjustable camera back, a frame, a cover movably secured to said frame, upper and lower adjustable support bars movably secured to said frame, said upper and lower adjustable support bars each having a cutout therein, adjustable inserts located in the cutouts in said upper and lower adjustable support bars, threaded caps fixedly secured to said upper and lower adjustable support bars and extending over the ends of said adjustable inserts, a threaded stud accommodated in each end of said adjustable inserts and being at right angles thereto and engaging said threaded caps thereabove thereby moving the ends of said adjustable insert either inward or outward with respect to said upper and lower adjustable support bars, means on said upper and lower adjustable support bars for mounting a photographic plate, said adjustable inserts permitting forward or rearward adjustment of said photographic plate, plate holders movably supported on said adjustable inserts and providing a means of adjusting said photographic plate vertically and laterally.

2. In an adjustable camera back, a frame, a cover movably secured to said frame, upper and lower adjustable support bars movably secured to said frame, said upper and lower adjustable support bars each having a cutout therein, adjustable inserts located in the cutouts in said upper and lower adjustable support bars, threaded caps fixedly secured to said upper and lower adjustable support bars and extending over the ends of said adjustable inserts, a threaded stud accommodated in each end of said adjustable inserts and being at right angles thereto and engaging said threaded caps thereabove thereby moving the ends of said adjustable inserts either inward or outward with respect to said upper and lower adjustable support bars, means on said upper and lower adjustable support bars for mounting a photographic plate, said adjustable inserts permitting forward or rearward adjustment of said photographic plate, said means comprising flat holding strips fixedly secured to the one side of said adjustable inserts and extending past the inner edges thereof thus providing a backing against which said photographic plate may be held, the lower edge of said upper adjustable support bar having a recess therein, a spring catch mounted on the recess in said upper adjustable support bar and adapted to engage the upper edge of said photographic plate when the same is placed in position in said frame, plate holders movably supported on said adjustable insert and providing a means of adjusting said photographic plate vertically and laterally, plate clamps mounted on said upper and lower adjustable support bars for engaging said photographic plate after the same has been suitably adjusted in position.

3. In an adjustable camera back, a frame, a cover movably secured to said frame, upper and lower adjustable support bars movably secured to said frame, means on said upper and lower adjustable support bars for mounting a photographic plate, said means comprising plate holders movably mounted on said lower adjustable support bar permitting minute vertical and lateral adjustment of said photographic plate, adjustable inserts supported on said upper and lower adjustable support bars permitting forward or rearward adjustment of said photographic plate with respect to the camera lens for bringing the former into correct focus with the latter, and plate clamps for substantially retaining said photographic plate in its adjusted position in said frame, said plate clamps each consisting of a rod extending parallel to said adjustable support bars, arms movably supporting said rod, said rod being fixedly secured with respect to said arms, and a bracket secured to said adjustable support bar and pivotally mounting the opposite end of said arms, resilient rollers slidably mounted on said rod, a lever pivotally mounted on said bracket, and a spring connecting said lever and said arms thereby providing a means of raising or lowering said arms upon manipulation of said lever, as said lever is closed to a certain position the pivot point of the same, and the pivot point of said spring, and the point of connection of said spring to said arms being in line, and as said lever is closed further the pivot point of said spring and said lever thus passing a neutral line and accordingly tending to keep said lever in a closed position and exerting a suitable pressure on said resilient rollers in engagement with said photographic plate.

4. In an adjustable camera back, a frame, a cover movably secured to said frame, upper and lower adjustable support bars movably secured to said frame, means on said upper and lower adjustable support bars for mounting a photographic plate, said means comprising adjustable inserts supported on said upper and lower adjustable support bars, and a left hand plate holder and a right hand plate holder movably mounted on said adjustable insert on said lower adjustable support bar, said adjustable insert on said lower adjustable support bar having a plurality of tapped holes suitably spaced apart towards each end thereof, and a plurality of positioning holes located on each side of the tapped holes, said left hand plate holder consisting of a base, a screw extending through a part of said base and engaging any one of the suitably spaced apart tapped holes in said adjustable insert, pins fixedly secured in said base and engaging the positioning holes located on each side of the engaged tapped holes in said adjustable insert, a vertical adjusting means mounted on said base and consisting of a shaft extending through a portion thereof, a finger grip fixedly secured on the outer end of said shaft, said shaft having an annular groove cut therein, a retaining ball within said base, a compression spring accommodated in said base and exerting pressure on said retaining ball thereby engaging the same in the annular groove in said shaft and accordingly permitting said shaft to turn and at the same time preventing said shaft from being removed from said base, a pair of stop pins fixedly secured to said base and projecting outward therefrom at each side of said shaft and adapted to engage said finger grip when the same is turned a predetermined distance in either direction, an eccentric pin fixedly secured in the inner end of said shaft, and a satin spring lying over said eccentric pin and being raised or lowered by the latter as said shaft is turned thus providing a means of vertically adjusting said satin spring upon which said photographic plate rests, a horizontal adjusting means supported on a raised portion of said base and consisting of a second shaft, a second retaining ball within said base and a second compression spring accommodated in said base and bearing against said second retaining ball, said second shaft having an annular groove therein and being engaged by said second retaining ball, a second finger grip fixedly secured on the outer end of said second shaft, a second stop pin and a stop strip secured on said base and adapted to engage said second finger grip when the latter is turned a predetermined distance, a second eccentric pin secured in the inner end of said second shaft, and a roller rotatably mounted on the second eccentric pin, said roller adapted to engage the edge of the said photographic plate for laterally adjusting the position of the same, said right hand plate holder consisting of a base having a satin spring supported thereon and operated by an eccentric pin similar to said eccentric pin on said base of said left hand plate holder and in conjunction with one another providing a means of vertically adjusting one or both sides of said photographic plate supported thereon, and plate clamps mounted on said upper and lower adjustable support bars for substantially retaining said photographic plate in any adjusted position in said frame.

5. In an adjustable camera back, a frame consisting of vertical side members, and horizontal cross members secured to said vertical side members, a cover movably secured to the rear of said frame, upper and lower adjustable support bars movably mounted with respect to said frame, positioning cones secured to said upper and lower adjustable support bars, said vertical side members having cone-like holes therein and adapted to receive said positioning cones on said upper and lower adjustable support bars when the latter are secured in position on said frame, means on said upper and lower adjustable support bars for mounting a photographic plate, said means comprising plate holders movably supported on said lower adjustable support bar and adapted to permit vertical and lateral adjustment of said photographic plate, adjustable inserts mounted in said upper and lower adjustable support bars for permitting depth adjustment of said photographic plate with respect to the camera, and plate clamps mounted on said upper and lower adjustable support bars for substantially holding said photographic plate in position after the adjustment thereof, a fitting assembly extending through one of said vertical side members and adapted for connection to a vacuum arrangement, the aforesaid vacuum arrangement being used for holding two photographic plates substantially in contact with one another.

6. In an adjustable camera back, a frame consisting of vertical side members, upper and lower horizontal cross members secured to said vertical side members, a cover movably secured to the rear of said frame, upper and lower adjustable support bars movably mounted with respect to said frame, positioning cones secured to said upper and lower adjustable support bars, said vertical side members having cone-like holes therein and adapted to receive said positioning cones on said upper and lower adjustable support bars when the latter are secured in position on said frame, means on said upper and lower adjustable support bars for mounting a photographic plate, said means comprising plate holders movably supported on said lower adjustable support bar and adapted to permit vertical and lateral adjustment of said photographic plate, adjustable inserts mounted in said upper and lower adjustable support bars for permitting depth adjustment of said photographic plate with respect to the camera, and plate clamps mounted on said upper and lower adjustable support bars for substantially holding said photographic plate in position after the adjustment thereof, said upper horizontal cross members having a longitudinal groove in the underside towards the front thereof, said cover having a tongue extending along the top edge thereof and adapted for engagement in the longitudinal groove in said upper horizontal cross member when said cover is being placed in position on said frame, a resilient strip adhered to the bottom edge of said cover and tongues extending vertically along the inside face of said cover towards each side thereof, said tongues on the inside face of said cover fitting inside said vertical side members of said frame thus locating said cover laterally with respect to said frame, and said resilient strip on the bottom edge of said cover resting upon said lower horizontal cross member, a pair of fastening pins extending outward from the side edges of said cover, hooks pivotally secured to the outer side of said vertical side members of said frame and adapted to engage said pair of fastening pins for substantially holding said cover in position on said frame.

7. In an adjustable camera back, a frame consisting of vertical side members, and horizontal cross members secured to said vertical side members, upper and lower adjustable support bars movably mounted with respect to said frame, positioning cones secured to said upper and lower adjustable support bars, said vertical side members having cone-like holes therein and adapted to receive said positioning cones on said upper and lower adjustable support bars when the latter are secured in position on said frame, means on said upper and lower adjustable support bars for mounting a photographic plate, said means comprising plate holders movably supported on said lower adjustable support bar and adapted to permit vertical and lateral adjustment of said photographic plate, adjustable inserts mounted in said upper and lower adjustable support bars for permitting depth adjustment of said photographic plate with respect to the camera, and plate clamps mounted on said upper and lower adjustable support bars for substantially holding said photographic plate in position after the adjustment thereof.

CRESSWELL REDVERS GREGORY.

REFERENCES CITED

The following references are of record in the file of this patent:

UNITED STATES PATENTS

| Number | Name | Date |
| --- | --- | --- |
| 530,100 | Flammang | Dec. 4, 1894 |
| 1,944,561 | Kronschnabl | Jan. 23, 1934 |
| 2,161,352 | Hopkins | June 6, 1939 |